No. 873,329. PATENTED DEC. 10, 1907.
G. SCHMITT.
VEHICLE SPRING.
APPLICATION FILED MAR. 18, 1907.
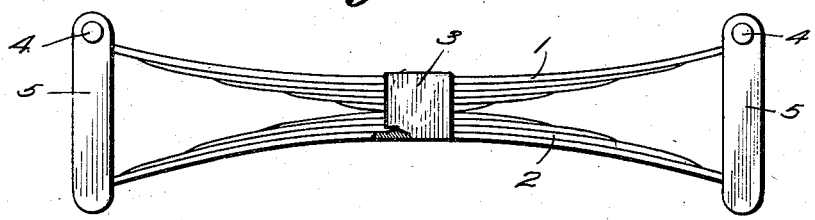
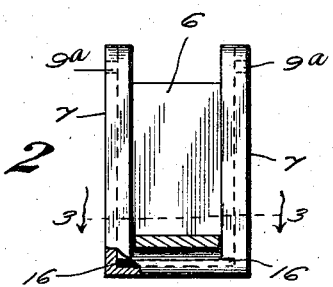
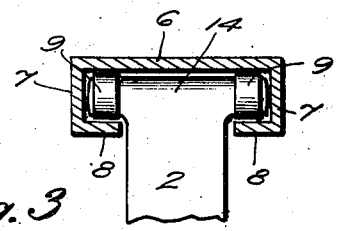
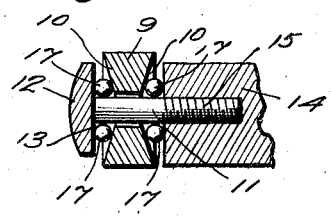
Inventor
Gustav Schmitt
Witnesses
By Victor J. Evans
Attorney

UNITED STATES PATENT OFFICE.

GUSTAV SCHMITT, OF MILWAUKEE, WISCONSIN.

VEHICLE-SPRING.

No. 873,329.  Specification of Letters Patent.  Patented Dec. 10, 1907.

Application filed March 18, 1907. Serial No. 363,091.

*To all whom it may concern:*

Be it known that I, GUSTAV SCHMITT, a citizen of the United States of America, residing at Milwaukee, in the county of Milwaukee and State of Wisconsin, have invented new and useful Improvements in Vehicle-Springs, of which the following is a specification.

This invention relates to vehicle springs, and one of the principal objects of the same is to provide means for absorbing the vibratory motions of the vehicle when the wheels strike a stone or other obstruction, or when the wheels suddenly run into a rut.

Another object of the invention is to provide a recoil spring to be connected to the ordinary vehicle spring to limit the recoil action of the vehicle spring when the vehicle is passing over a rough road.

These and other objects may be attained by means of the construction illustrated in the accompanying drawing, in which:

Figure 1 is a side elevation of a vehicle spring made in accordance with my invention. Fig. 2 is an inside face view of one of the connecting links for the springs. Fig. 3 is a sectional view on the line 3—3, Fig. 2, looking in the direction of the arrows. Fig. 4 is a detail sectional view showing the manner of mounting the ends of the recoil spring on ball bearings within the links.

Referring to the drawing for a more particular description of my invention, the numeral 1 designates the upper bow spring, and 2 is the reversely bowed recoil spring, said two springs being secured together by means of a central spring leaf receptacle 3 formed integral with the lower member of the spring 2 and bent upward to inclose the other leaves or members of the springs 1 and 2. The outer ends of the spring 1 are provided with suitable tubular bearings heads, and connected to said bearing heads by means of the bolts 4 are the hollow links 5, said links each comprising a box-like structure having an outer wall 6, sides 7, and inturned flanges 8. The bolts 4 pass through openings 9ª in the links. The outer ends of the recoil spring 2 are fitted with ball bearings, said ball bearings comprising a roller 9, the opposite faces of which are oppositely beveled or inclined, as at 10, Fig. 4. A bolt 11 provided with a head 12 having a plain inner face 13, is secured to the head 14 of the spring 2 by turning its threaded shank 15 in a socket in the end of said head. As shown in Fig. 3 it will be noted that two of such rollers 9 are utilized, one upon each side of the head 14, and these rollers are adapted to engage the flanges 8 and the inner surface of the wall 6, thus materially reducing the friction as the springs move toward each other at their outer ends. Seated in the bottom of the links 5 is a rubber cushion 16 designed to provide a buffer for the head 14 at the bottom of the links. Steel balls 17 are disposed at the opposite sides of the rollers and bear upon the shank of the bolt 11, and against the head thereof, and against the inclined surfaces of the rollers.

From the foregoing it will be obvious that a vehicle spring made in accordance with my invention, will be found particularly desirable for automobiles and other high speed vehicles, and will serve to prevent undue vibration of the body portion of the vehicle in passing over rough and uneven roads. Owing to the ball bearing rollers 9, the relative movement of the springs will not create undue friction and the springs will work smoothly under all conditions.

Having thus described the invention, what I claim is:

1. A vehicle spring comprising oppositely bowed springs connected together in the center, links connected to the ends of one of said springs, and rollers connected to the ends of the other spring and mounted to move in said links.

2. In a vehicle spring, the combination of a bowed spring having rollers mounted upon the opposite ends thereof, and links connected to the other spring and receiving the rollers.

3. In a vehicle spring, the combination of a spring member provided with oppositely disposed ball bearing rollers mounted on the ends of said spring, and links provided with inturned flanges in which said rollers travel.

4. A vehicle spring comprising oppositely bowed springs secured together in the center, links connected to the upper spring and provided with inturned flanges, a rubber buffer in the bottom of said links, rollers mounted upon the opposite ends of the lower bowed spring, said rollers being inclosed within the links, substantially as described.

In testimony whereof, I affix my signature in presence of two witnesses.

GUSTAV SCHMITT.

Witnesses:
CHRIST. HILLER,
CHAS. F. EHLERT.